May 9, 1967 R. F. HUBER 3,318,992
STRESS RELIEF APPARATUS
Filed Nov. 3, 1965
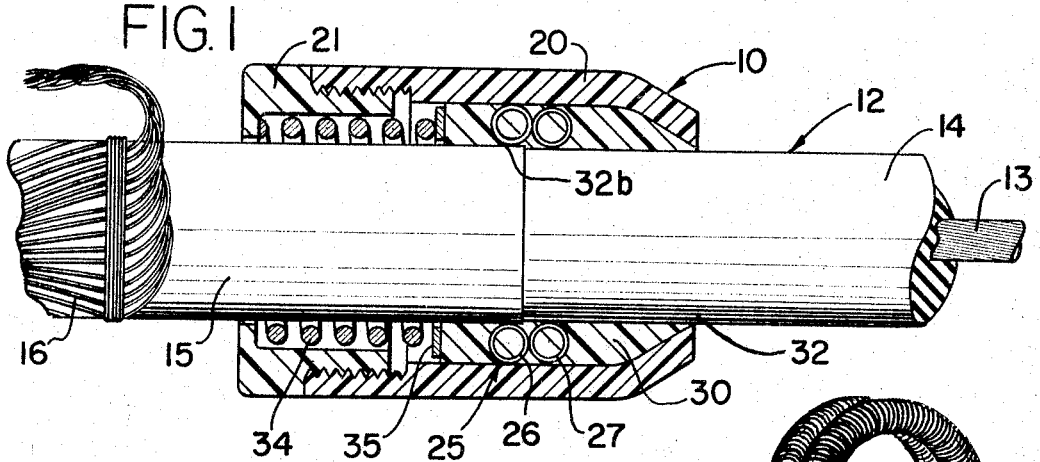
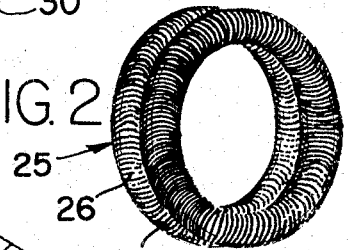
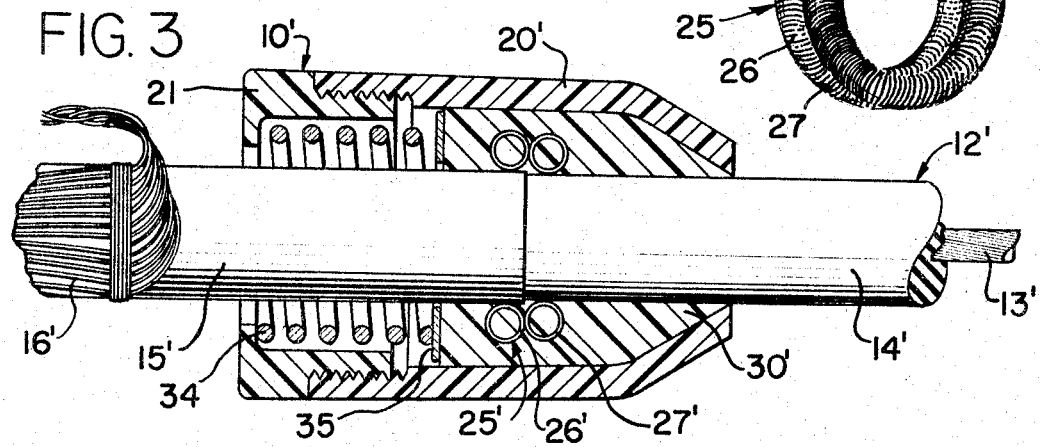
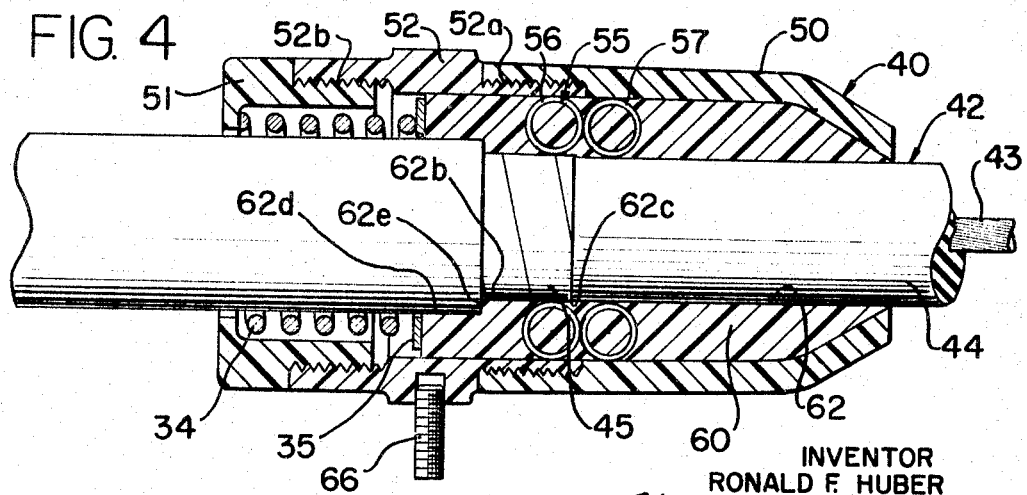
INVENTOR
RONALD F. HUBER
BY Mason, Kolehmainen,
Rathburn & Wyss.
ATTORNEYS

# United States Patent Office 3,318,992
Patented May 9, 1967

3,318,992
STRESS RELIEF APPARATUS
Ronald F. Huber, Evanston, Ill., assignor to Joslyn Mfg. and Supply Co., Chicago, Ill., a corporation of Illinois
Filed Nov. 3, 1965, Ser. No. 506,249
8 Claims. (Cl. 174—73)

The present invention relates to a new and improved stress relief apparatus, and, more particularly, to a new and improved apparatus for the stress relief termination of a high voltage shielded power cable. The present invention is an improvement over my prior invention described and claimed in my earlier filed application, Ser. No. 475,803, filed July 29, 1965, and assigned to the same assignee as the present invention.

There is presently an increasing trend toward the transmission and distribution of electric power by means of underground residential distribution cables in order to avoid the undesirable features of overhead lines. Furthermore, in order to transport the ever increasing quantity of electrical energy demanded, it becomes necessary to convey it at higher and higher voltages and to use larger diameter conductors.

Coaxial power cables having a central conductor surrounded by insulation and an outer conducting sheath, both of the concentric neutral and tape-shielded types, have been extensively employed in the underground transmission of electrical energy. Such cables must be terminated in order to make necessary connections to surface loads, switch gear, and the like. Cable terminations operating at voltages above 5000 volts give rise to several problems which become more severe as the operating voltage is increased. First, the conducting sheath must be removed for some distance from the actual terminal in order to expose sufficient dielectric insulation to control surface leakage and to prevent flashover. This exposed dielectric structure should be comparable in insulation value to the basic insulation level of other equipment to which the cable is connected. Secondly, in the region where the conducting sheath is discontinued, the insulation and the air surrounding it are subjected to electrical gradients which may be sufficiently high to produce corona.

Since both concentric-neutral and tape-shielded cables are commercially used, it is necessary to provide stress relief apparatus capable of handling each of these cable types. Because of the large volume of such high voltage terminations required commercially, it is desirable that the stress relief apparatus be inexpensive. Moreover, many problems of manufacture and stocking may be minimized if some identical parts may be used for different sizes and types of cable terminations.

It is therefore an object of the present invention to provide a new and improved stress relief apparatus.

It is an object of the present invention to provide new and improved stress relief apparatus adaptable for terminating both the concentric-neutral and the tape-shielded types of electrical cable.

Yet a further object of the present invention is to provide an apparatus for stress relief of a shielded high-voltage power cable which is comparatively inexpensive.

Yet a further object of the present invention is to provide an apparatus for stress relieving a high voltage cable of the type adapted for underground residential distribution.

Further objects and advantages of the present invention will become apparent as the following description proceeds and the features of novelty which characterize the invention, will be pointed out with particularity in the claims annexed to and forming a part of this specification.

In accordance with these and many other objects of the present invention, the preformed stress relief apparatus embodies a plastic housing enclosing an elastomer filler in substantially air-free interfacial engagement and containing an improved stress relief member. The elastomer filler is provided with a longitudinal bore adapted to receive the cable, and a portion of the stress relief member extends along the inner surface of the bore for engaging the conductive shielding of the cable.

The improved stress relief member embedded within the filler is formed of a pair of joined toroidal elements, each of the elements being formed of a continuous length of helically wound conducting wire. The stress relief apparatus is assembled on the terminus of a cable so that the lower toroidal element electrically engages the insulation shield of the cable.

Advantageously the upper toroidal element performs the stress relief function and the lower toroidal element electrically connects the upper toroidal element to the ground through the insulation shield. In the concentric-neutral type of cable the toroidal elements do not have to touch the insulation housing of the stress relief apparatus and the depth diameter of the toroidal elements can be the same for all sizes of cables. This simplifies manufacturing and inventory problems of the stress relief apparatus in that some same parts may be used to terminate several different sizes of cables. Additionally, the helically wound toroidal elements are easier and less expensive to form than many other shapes of stress relief members.

The stress relief apparatus is readily adaptable to tape-shielded cables by the insertion of a conducting cylinder between the housing and cap of the stress relief apparatus which is electrically connected to the toroidal element and which is provided with a suitable grounding stud.

For a better understanding of the present invention reference may be had to the accompanying drawing wherein:

FIG. 1 is a cross sectional view of the improved stress relief apparatus assembled on the terminus of a concentric-neutral cable;

FIG. 2 is a perspective view of the stress relief member used in the stress relief apparatus in FIG. 1;

FIG. 3 is a cross sectional view of a stress relief apparatus similar to FIG. 1, but shown assembled on a concentric-neutral cable of smaller diameter than that shown in FIG. 1; and FIG. 4 is a cross sectional view of a stress relief apparatus assembled on a tape-shielded cable.

Referring now to the drawings, and particularly to the embodiment of FIGS. 1 and 2, there is shown an improved stress relief apparatus 10 on the terminus of a high voltage electrical cable 12. The illustrated cable 12 is of the underground residential distribution type employing a concentric-neutral and having a central conductor 13 encased in a solid insulation 14 with a neutral outer sheathing or conducting layer 15 of polyethylene or other suitable material. Commercially the cable 12 would additionally be provided with conducting neutral wires 16.

Referring now to the stress relief apparatus 10, the stress apparatus 10 includes an outer housing 20 of suitable insulating material such as ABS plastic (Acrylonitrile Butadiene Styrene) containing ultra-violet inhibitors. The housing 20 has a generally cylindrical portion with an inwardly tapering end portion of somewhat conical shape as more fully described in my above mentioned earlier filed pending application. A screw cap 21 is provided at the end of the housing 20 remote from the conical portion and is screw threaded relative to the housing 20.

To provide for the stress relief, the stress relief apparatus 10 includes a stress relief member 25, best illustrated in FIG. 2. The stress relief member 25 is formed of a pair of toroidal elements 26 and 27, electrically connected together and each formed from a continuous length of a helically wound conducting wire. The two ends of the wire forming each toroidal element are electrically connected together as by soldering or the like.

The stress relief member 25 is embedded in an elastomer filler 30 which may be made of polyurethane. The filler 30 is provided with a central longitudinal bore 32 having an enlarged countersunk portion 32b and adapted to receive the cable 12. The sheathing 15 is received within the enlarged portion 32b against a shoulder formed at the inner end of the enlarged portion. The stress relief member 25 is embedded within the filler 30 with the lower one of the toroidal elements 26 extending along the inner surface of the enlarged portion 32b of the bore 32 for electrically engaging the conductive sheathing 15 of the cable 12.

As more fully described in my above mentioned co-pending application, there is provided a substantial air-free interface between the filler 30 and the housing 20. To continuously load the filler 30 to maintain the substantially air-free interface between the filler 30 and the housing 20 there is provided a compression spring 34 between the screw cap 21 and the filler 30. If desired, a canvas-phenolic thrust washer 35 may be provided between the spring 34 and the filler 30.

From the above detailed description of the stress relief apparatus, the operation thereof is believed clear. However, briefly, to use the stress relief apparatus 10, the installer prepares the cable as he would for any termination by stripping the insulation 14 and sheathing 15 as indicated in FIG. 1. Grease may be applied to the cable and to the elastomer filler and the loosely assembled filler 30 is assembled onto the cable and slid into the housing so that the lowermost one of the toroidal elements 26 will electrically engage the conducting layer 15 of the cable 12. Tightening of the screw cap 21 loads the filler 30 and wipes the air from the stress relief area to provide a corona-free installation.

Advantageously both stress relief and grounding are provided by the stress relief member 25 embedded in the insulating elastomer filler 30. The helically wound wires of the lowermost toroidal elements 26 emerge from the filler 30 on the inner bore thereof to make contact with the cable shielding when the elastomer is installed. The uppermost one of the toroidal elements 27 provides a somewhat conical stress relief distribution of the voltage gradient. The uppermost one of the toroidal elements 27 is grounded to the lower element 26 and the conducting wire 15 to the cable 12.

FIG. 3 illustrates an improved stress relief apparatus 10' assembled on an electrical cable 12' of smaller diameter than the cable 12 illustrated in FIG. 1. The cable 12' includes a central conductor 13' encased in suitable insulation 14' with a neutral outer sheathing or conducting layer 15'. As illustrated, the cable 12' additionally is provided with conducting neutral wires 16'. The stress relief apparatus 10' includes an outer housing 20' closed at one end by a screw cap 21.

The stress relief of the stress relief apparatus 10' includes a stress relief member 25' including the electrically connected toroidal elements 26' and 27', each formed of wire helically wound identically to that described in the embodiment of FIG. 1. The stress relief member 25' is embedded in a suitable insulated elastomer filler 30' which is compressed within the outer housing 20' through a compression spring 34 and a suitable thrust washer 35.

It will be seen that since it is not necessary for the toroidal elements 26' and 27' to engage the housing 20', that identically wound stress relief members 25' having the same depth diameter, may be used for cables of various diameters. Moreover, the identical cap 21 and spring 34 may be used in both the large and small cable sizes as illustrated in FIGS. 1 and 3.

FIG. 4 illustrates a stress relief apparatus according to the present invention adapted for use on a tape-shielded cable. As therein illustrated, there is shown a stress relief apparatus 40 on the terminus of a high-voltage electric cable 42 of the tape-shielded type. The cable 42 has a central conductor 43 encased in a solid insulation 44 with a neutral outer conducting tape-shielding 45. A conventional protective layer or insulated jacket 46, of neoprene or other suitable material, encases the tape-shielding.

Referring now to the stress relief apparatus 40, the stress relief apparatus 40 is similar to that heretofore described in the embodiments of FIGS. 1 and 2, and FIG. 3 except for the addition of a conducting cylinder to provide for grounding of the tape-shielding. Specifically the stress relief apparatus includes a housing member defined by an outer housing 50 of suitable insulating material such as the above mentioned ABS plastic containing ultra-violet inhibitors and a conducting cylinder 52. A screw cap 51 is provided at one end of the housing member.

To provide for stress relief, the stress relief apparatus 40 includes a stress relief member 55, similar to the stress relief member 25 but of suitable dimensions. Specifically the stress relief member 55 includes a pair of electrically joined toroidal elements 56 and 57, each formed of a length of helically wound conducting wire. The two ends of the wire forming each of the toroidal elements 56 and 57 are electrically joined together, as by soldering.

The stress relief member 25 is embedded in an elastomer filler 60 which may be of polyurethane. The filler 60 is provided with a central longitudinal bore 62 having an enlarged countersunk portion 62b adapted to receive the cable 42. The tape-shielding 45 is received within the enlarged portion 62b against a shoulder 62c. An additional larger counterbore 62d may be provided in the filler 60 to receive the insulating jacket 46 which, in turn, may abut against an additional shoulder 62e formed in the filler 60.

The conducting cylinder 52 is provided with an externally threaded portion 52a, threaded into internal threads in the outer housing 50, and additionally is provided with an internal threaded portion 52b, receiving the threaded portion of the cap 51.

To continuously load the filler 60 and to maintain the substantially air-free interface between the filler 60 and the housing 50, there is provided the compression spring 34 between the screw cap 51 and the filler 60. If desired, the canvas-phenolic thrust washer 35 may be used between the spring 34 and the filler 60.

The lower one of the toroidal elements 56 has its inner surface in engagement with the tape-shielding 45 of the cable 42, while the outer portion of the toroidal element 56 engages against the inner surface of the conducting cylinder 52. Thus the tape-shielding 45 is electrically connected through the lower one of the toroidal elements 56 to the conducting cylinder 52. A grounding stud 66 is provided in the conducting cylinder to permit grounding of the cylinder. It will be understood that the upper one of the toroidal elements 57 performs the stress relief function, while the lower one of the toroidal elements performs the grounding function.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A preformed stress relief apparatus for terminating the shielding of a shielded high voltage electrical cable, said apparatus comprising an insulated preformed tubular elastomer filler having a longitudinal bore adapted to receive a cable; a stress relief member embedded in said filler and formed of a pair of electrically joined toroidal elements; one of said elements extending along the inner surface of said bore for engaging the conductive shielding of a cable; and an insulating housing; said filler extending into said housing.

2. A preformed stress relief apparatus as defined in claim 1 above wherein each of each elements is formed by a continuous length of helically wound conducting wire, the respective ends of which are electrically joined together.

3. A preformed stress relief apparatus for terminating the shielding of a tape-shielded high-voltage electric cable, said apparatus comprising an insulated preformed tubular elastomer filler having a longitudinal bore adapted to receive a cable, a stress relief member partially embedded in said filler and formed from a pair of joined toroidal elements, one of said elements having an inner portion extending along the inner surface of said bore for engaging the conductive shielding of a cable, and having an outer portion extending along the outer surface of said filler; a housing member including an insulated housing and a cylindrical conducting cylinder; said filler extending into said housing member with the outer portion of said one of said toroidal elements engaging the inner surface of said conducting cylinder.

4. A preformed stress relief apparatus as set forth in claim 3 above wherein each of said elements is formed of a continuous length of helically wound conducting wire, the respective ends of each of said wires being electrically joined together.

5. A preformed stress relief apparatus for terminating the shielding of a tape-shielded high-voltage electrical cable, said apparatus comprising an insulated preformed tubular elastomer filler having a longitudinal bore adapted to receive a cable; a stress relief member partially embedded in said filler and formed of a pair of joined toroidal elements, each of said elements being formed of a continuous length of helically wound conducting wire; a housing member including an insulating housing and a conducting cylinder having an internal wall surface, said filler extending into said housing with the lowermost one of said toroidal elements adapted to have its inner surface in engagement with tape-shielding of a cable and having its outer surface in engagement with said internal wall surface; resilient means for applying force on said filler to maintain said filler in substantially air-free interfacial engagement with said housing members; and grounding means connected to said conducting cylinder for grounding said conducting cylinder.

6. In combination with a tape-shielded, high-voltage electrical cable, a preformed stress relief apparatus for terminating the tape-shielding of said cable, comprising an insulated preformed tubular elastomer filler having a longitudinal bore and an outer peripheral surface, said filler being carried on said cable with the end of the cable protruding from one end of said filler; a stress relief member formed of a pair of joined toroidal elements, each of said elements being formed of a continuous length of helically wound conducting wire, the ends of each of said wires being electrically joined together, said stress relief member being embedded in said filler with an inner portion of one of said toroidal elements extending from the inner surface of said filler and an outer portion of said one of said toroidal elements extending through the outer surface of said filler; a housing member including an outer insulating housing and a conducting cylinder having an internal wall surface, said cable and filler extending into said housing in substantially air-free interfacial engagement with said inner portion of said one of said toroidal elements electrically engaging said tape-shielding, and said outer portion of said one of said toroidal elements engaging said internal wall surface.

7. A preformed stress relief apparatus for terminating the shielding of a concentric-neutral type high-voltage electrical cable, said apparatus comprising an insulated preformed tubular elastomer filler having a longitudinal bore adapted to receive a cable; a stress relief member partially embedded in said filler and formed of a pair of joined toroidal elements, each of said elements being formed of a continuous length of helically wound conducting wire; an insulating housing having an internal wall surface; said filler extending into said housing with the lowermost one of said toroidal elements adapted to have its inner surface in engagement with conducting shielding of a cable; and resilient means for applying force on said filler to maintain said filler in substantially air-free interfacial engagement with said insulated housing.

8. In combination with a concentric-neutral type shielded, high-voltage electrical cable; a preformed stress relief apparatus for terminating the shielding of said cable, comprising an insulated preformed tubular elastomer filler having a longitudinal bore and an outer peripheral surface, said filler being carried on said cable with the end of the cable protruding from one end of said filler; a stress relief member formed of a pair of electrically joined toroidal elements, each of said elements being formed of a continuous length of helically wound conducting wire, the ends of each of said wires being electrically joined together; said stress relief member being embedded in said filler with an inner portion of one of said toroidal elements extending from the inner surface of said filler; said cable and filler extending into said housing member in substantially air-free interfacial engagement with said inner portion of said one of said toroidal elements electrically engaging said shielding.

No references cited.

LARAMIE E. ASKIN, *Primary Examiner.*